US009812023B2

(12) United States Patent
Staszak (10) Patent No.: US 9,812,023 B2
(45) Date of Patent: Nov. 7, 2017

(54) AUDIBLE METADATA

(75) Inventor: Chris Staszak, San Diego, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1863 days.

(21) Appl. No.: 11/852,809

(22) Filed: Sep. 10, 2007

(65) Prior Publication Data

US 2009/0070114 A1 Mar. 12, 2009

(51) Int. Cl.
*G10L 13/00* (2006.01)
*G09B 5/06* (2006.01)
*G06F 17/30* (2006.01)

(52) U.S. Cl.
CPC ........... *G09B 5/06* (2013.01); *G06F 17/3005* (2013.01); *G10L 13/00* (2013.01)

(58) Field of Classification Search
CPC ....... G10L 13/00; G10L 13/02; G10L 13/027; G10L 13/033; G10L 13/08; G10L 2013/00; G10L 2013/02; G10L 2013/08
USPC ................ 704/260, 258, 269, 257, 270, 278
See application file for complete search history.

(56) References Cited

U.S. PATENT DOCUMENTS

| | | | |
|---|---|---|---|
| 7,020,888 B2* | 3/2006 | Reynolds et al. | 725/34 |
| 7,376,155 B2* | 5/2008 | Ahn et al. | 370/503 |
| 7,441,180 B1* | 10/2008 | Kaczmarek | G06F 17/30174 709/201 |
| 7,827,312 B2* | 11/2010 | Ramaswamy et al. | 709/246 |
| 2002/0087224 A1* | 7/2002 | Barile | 700/94 |
| 2003/0158737 A1* | 8/2003 | Csicsatka | 704/273 |
| 2005/0102625 A1* | 5/2005 | Lee et al. | 715/727 |
| 2005/0137869 A1* | 6/2005 | Sihn et al. | 704/258 |
| 2006/0095848 A1* | 5/2006 | Naik | 715/716 |
| 2006/0242325 A1* | 10/2006 | Ramaswamy et al. | 709/246 |
| 2007/0156410 A1* | 7/2007 | Stohr et al. | 704/275 |
| 2010/0094897 A1* | 4/2010 | Sumrall et al. | 707/769 |

* cited by examiner

*Primary Examiner* — Qi Han
(74) *Attorney, Agent, or Firm* — James J. DeCarlo; Greenberg Traurig, LLP (57) ABSTRACT

This disclosure describes systems and methods for audibly presenting metadata. Audibly presentable metadata is referred to as audible metadata. Audible metadata may be associated with one or more media objects. In one embodiment, audible metadata is pre-recorded requiring little or no processing before it can be rendered. In another embodiment, audible metadata is text, and a text-to-speech conversion device may be used to convert the text into renderable audible metadata. Audible metadata may be rendered at any point before or after rendering of a media object, or may be rendered during rendering of a media object via a dynamic user request.

23 Claims, 10 Drawing Sheets

AUDIBLE METADATA

BACKGROUND

Music, videos, and other media objects are often accompanied by or associated with metadata, or data describing the media objects. Metadata may include information identifying the associated media objects, artists, authors, year of production or publication, genres, etc. Metadata is often displayed by certain media players, such as IPOD and WINDOWS MEDIA PLAYER, to assist users in organizing and recognizing media objects.

For instance, the common MPEG-1 Audio Layer 3 or MP3 format of songs, contains a tag or set of metadata that indicates the song title, track number, artist, album, year of publication, genre, and/or other information describing the MP3. A tag may also include album art comprising such file formats as .jpg and .bmp. The most widespread standard audio tag formats are ID3v1 and ID3v2, and the more recently introduced APEv2. ID3v1 and ID3v2 tags are supported in software such as ITUNES, WINDOWS MEDIA Player, WINAMP, YME, MUSICMATCH and hardware players like APPLE's IPOD, Creative Zen, Toshiba Gigabeat and SONY's WALKMAN. The ID3v2 tag contains up to 256 megabytes of data which can include text-based descriptions of a given song as well as pictures.

Devices and software able to render MP3s are often also able to recognize metadata and display the metdadata. For instance, the song titles, genre descriptions, etc. displayed in the ITUNES and WINDOWS MEDIA Player graphical user interfaces (GUIs) are rendered from metadata embedded in MP3s or retrieved from remote servers. Another metadata format is MPEG-7, a format used to encode data about other media formats, often video formats such as MPEG-1, MPEG-2, MPEG-3, and MPEG-4.

SUMMARY

Systems and methods for audibly presenting metadata are disclosed. Metadata, associated with a media object, can be accessed before, during, or after the rendering of a media object, and the metadata can be rendered as an audible output by a media player. In one embodiment, while the media player renders the media object, an audible metadata module can monitor for a user command to render audible metadata. Upon receiving a request for audible metadata, the audible metadata module can access metadata for the current media object and, if necessary, convert it to a form that the media player can render. In another embodiment, the audible metadata module receives a pre-set user request for audible metadata, and proceeds to access and/or identify audible metadata before or after the media object is rendered. In one embodiment the audible metadata takes the initial form of text, and a text-to-speech module produces an audio clip from the text which can be rendered by the media player.

One aspect of the disclosure is a method that includes analyzing a media object to identify metadata associated with the media object. The method also includes analyzing said metadata to identify audible metadata. The format of the audible metadata is identified, and if the format is not of a desired format, then the audible metadata is converted to the desired format.

Another aspect of the disclosure is a system wherein the media object and audible metadata are handled by separate modules: the media player module and the audible metadata module respectively. The media player module accesses and renders the media object, while the audible metadata module accesses metadata associated with the media object and renders an audible form of the metadata to the user.

Yet, another aspect of the disclosure is a method that identifies a relationship between a media object and metadata, identifies audible metadata based on the metadata, associates the audible metadata with the media object, and makes the audible metadata available to a media player.

Another aspect of the disclosure includes a computer readable medium that stores computer data in machine readable form. The computer readable medium includes computer code for receiving a command to render a renderable media object. The renderable media object includes renderable media object data and information identifying metadata associated with the renderable media object. The metadata identifies audio data, different than the renderable media object data, the audio data being audible metadata associated with the media object.

Another aspect of the disclosure includes a method wherein a media object request is received and the media object is accessed. Metadata associated with the media object is accessed, and audible metadata is identified. Finally, the media object and audible metadata are rendered for audible perception.

In another aspect of the disclosure, a media object includes a content portion, a metadata portion, and an audible metadata portion. When the audible metadata portion is rendered via a media player it provides audible information about the content portion.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments of systems and methods described below and are not meant to limit the scope of the disclosure in any manner, which scope shall be based on the claims appended hereto.

DETAILED DESCRIPTION

The following definitions of a database, computer-readable media, and computing device will clarify the detailed description that follows the definitions. For the purposes of this disclosure, a database is one or more mass storage devices in which media objects and audible metadata may be stored and from which they may be retrieved. Storage may be volatile (referred to as "caching") or non-volatile (e.g. storage on a personal computer hard drive or non-volatile random access memory). The mass storage device includes some form of computer-readable media.

Computer-readable media include volatile and non-volatile, removable and non-removable media implemented in any method or technology for storage of information such as computer-readable instructions, data structures, program modules or other data. Computer-readable media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by a computing device.

A computing device includes a processor and memory for storing and executing program code, data and software. Computing devices may be provided with operating systems that allow the execution of software applications in order to manipulate data. Personal computers, PDAs, wireless devices, cell phones, internet appliances, media players, home theater systems, and media centers are several non-limiting examples of computing devices.

This disclosure describes systems and methods for audibly presenting metadata, referred to as audible metadata. Audible metadata may describe one or more media objects and may be audibly renderable by a media player. For example, audible metadata may be embedded in an MP3 file and rendered before rendering the MP3 data content, for example the encoded song, in order to audibly present metadata to the user. Examples of audible metadata include media object title, artist, genre, number of times the media object has been rendered, rendering duration, and/or the elapsed time since rendering began.

In one embodiment, audible metadata may include prerecorded audio data. For instance, audible metadata, such as song title, album title, or artist name may be spoken and recorded in .MP3, .WAV, or other audio formats. Prerecorded audible metadata may be rendered by a media player or may require processing.

In another embodiment, audible metadata may include text. Audible metadata as text may require a media player able to convert text into a renderable form. Alternatively, a text-to-speech module may convert text into a data structure that is renderable by a media player.

In one embodiment, audible metadata may be embedded in the media object. Embedded in the media object means that the audible metadata is contained within the data structure of the media object. For instance, just as the tag or metadata of an MP3 is embedded in an MP3 data structure, audible metadata may be embedded in an MP3 as an audible metadata tag. Alternatively, the audible metadata may be appended to the tag of an MP3. Embedded audible metadata may also include audible metadata that is appended to the beginning or end of a media object so that these two objects are included in a single file.

In another embodiment, audible metadata is a distinct file from the media object. For instance, the media object and audible metadata may be stored on the same computer hard drive, but as separate files. The media object and audible metadata may also reside on separate hard drives within a single computer. At the same time, the media object may reside on a computer readable medium such as a compact disc (CD), while the audible metadata resides on a computer readable medium residing on a device such as a computer. For example, the media object may reside on a CD, while the audible metadata resides on a remote server. In another example, the media may object reside on a computer while the audible metadata may reside on a remote server. In one non-limiting example, audible metadata may be stored on a server, and when a listener, listening to a song via internet radio, requests audible metadata, the server can transmit the audible metadata to the listener and the media player can render the audible metadata along with the song, preferably at the beginning or end of the song but it is contemplated that a user may request the audible metadata be rendered at any point.

Figure 1:
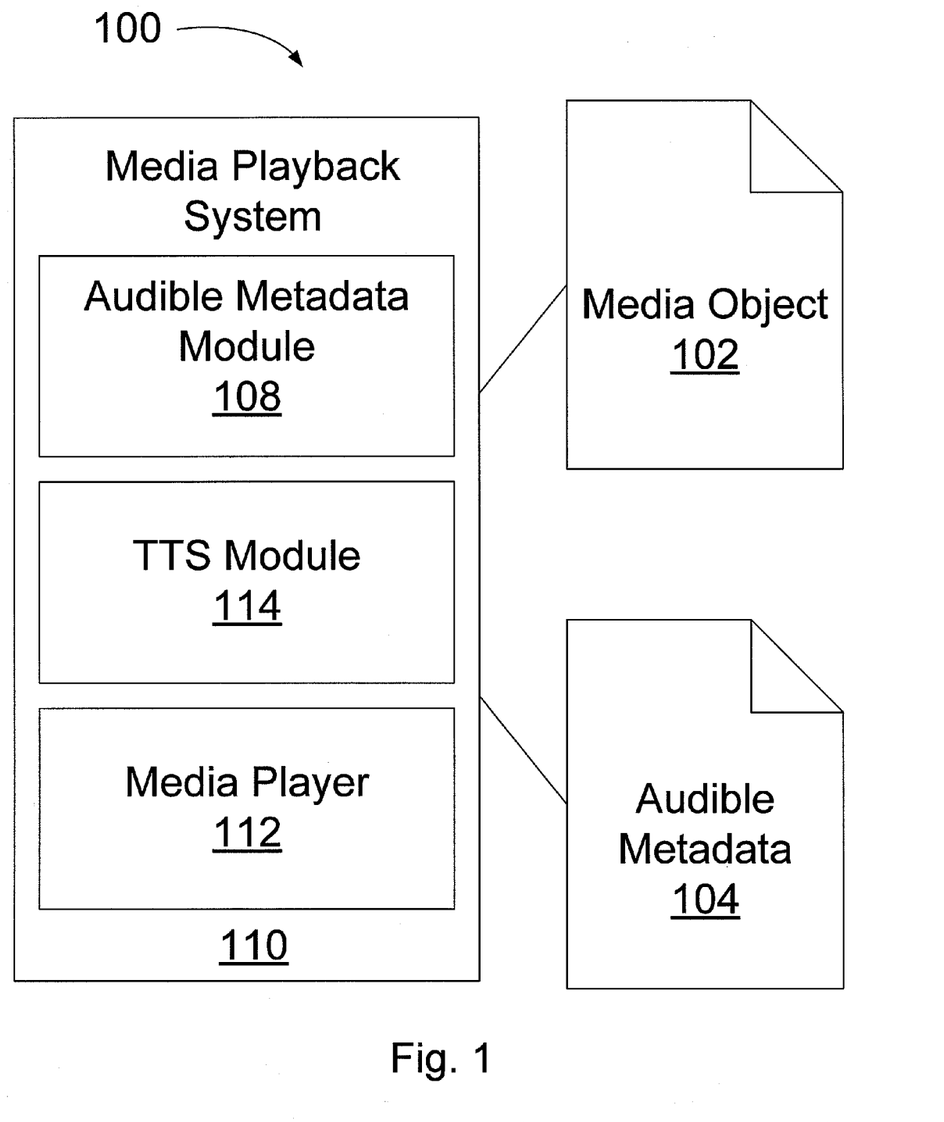
FIG. 1 illustrates an example of an embodiment depicting basic elements of a system for audibly rendering audible metadata.

FIG. 1 illustrates an example of an embodiment depicting basic elements of a system 100 for audibly rendering audible metadata. A user may request a media object 102 along with associated audible metadata 104. The media playback system 110 includes elements capable of accessing the media object 102 and audible metadata 104, identifying the audible metadata type, and rendering the media object 102 and audible metadata 104. More particularly, an audible metadata module 108 may access the media object 102 and audible metadata 104, and identify the audible metadata 104 type. A media player 112 may render the media object 102 and the audible metadata 104.

Rendering, for the purpose of this disclosure, generally refers to the process (or a plurality of processes) whereby a media player 112 converts a media object or audible metadata from an electronic form, typically as digital data, into a perceptible form, for visual, audible or tactile perception by a user. Audible metadata, as the name implies, is intended to be rendered audibly to a user.

The media object 102 includes data, such as a file, that can be rendered by a media player. The most common media objects 102 are either audio or video data or files. Audio media object formats include but are not limited to MP3 (also known as MPEG-1 Audio Layer 2), WINDOWS MEDIA audio (WMA), Advanced Audio Coding (AAC, and also known as MPEG-2 Part 7 and MPEG-4 Part 3), Waveform Audio File Format (WAV), SUPER AUDIO CD, DVD-A, and MIDI. Video formats include but are not limited to MPEG-1, MPEG-2, MPEG-3, MPEG-4. Some common media objects include songs, podcasts, spoken quotes, audio clips, music videos, movies, books, advertisements, and video clips. The media object 102 may also encompass a playlist of media objects such as songs, movies, or video clip, or may encompass a photo or a slide show. The media object 102 may also be streaming media such as for example, internet radio (e.g. YAHOO! LAUNCHCAST, Live365), satellite radio (e.g. SIRIUS SATELLITE RADIO, XM SATELLITE RADIO), or a video stream (e.g. YOU-TUBE, Break.com).

Streaming media, for the purposes of this disclosure, is a type of media that is rendered as quickly as practicable while a user device is receiving the content from a server in order to reduce the delay between the user request for the content and the initiation of the rendering of the content to the user. Streaming media may also include prefetching media, in which data is cached in anticipation of being transmitted to the sender. Before or during rendering streaming media, the user may or may not store a local copy of the received media content depending on the system.

The audible metadata 104 is as described earlier.

The media playback system 110 is a computing device, such as for example, a personal computer (PC), web-enabled personal data assistant (PDA), a smart phone, a CD or DVD player, or a laptop computer. The media playback system 110 may also be a purpose-built media device such as an IPOD. The media playback system 110 includes all elements that may be used to access, identify, and render audible metadata and may include an audible metadata module 108, a TTS module 114, and/or a media player 112.

The audible metadata module 108 encompasses software and/or hardware that may access audible metadata 104 and identify the audible metadata 104 type. Accessing includes locating audible metadata 104. Identifying includes determining whether the audible metadata 104 is text or prerecorded audio. Identifying also includes preparing audible metadata for rendering. For audible metadata 104 as text, a text-to-speech (TTS) module 114 may be used. A TTS module 114 may operate by concatenating pieces of prerecorded speech or may use a model of the human vocal system to completely synthesize desired sounds. Examples include APPLE PlainTalk, Festival Speech Synthesis System, Praat, Text2Speech, and Vocoder. The TTS module 114 may reside in hardware or software.

In addition to accessing and identifying audible metadata, the audible metadata module 108 may, in an embodiment, track the number of times a user has rendered a particular media object 102 and its associated metadata 104, and issue commands to discontinue metadata 104 rendering after a pre-set number of renders. This embodiment overcomes the problem of a user getting to know audible metadata so well that continued audible metadata rendering is not desired. The pre-set number of renders may have a default value and/or be customized by one or more users. Alternatively, discontinuation of metadata 104 rendering may be a function of the total amount of time that metadata 104 has been rendered. For example, instead of discontinuing metadata 104 rendering after 10 instances, rendering may be discontinued after metadata 104 has been rendered for a total of 100 seconds. Similarly, discontinuation may be a function of a decay function that takes into account both the number of times that metadata 104 has been rendered and the total time that metadata 104 has been rendered. In another embodiment, the rendering of metadata 104 may be tracked and information describing rendering of metadata 104 may be stored. An algorithm may analyze this information and determine a decay function describing the user's interest in having metadata 104 rendered. For example, tracking information may show that the user initially rendered metadata 104 every time that the media object 102 was rendered. Over time, however, the user less frequently rendered metadata 104. The algorithm may extrapolate the trend in rendering and determine a threshold number of renderings after which the algorithm predicts that the user will no longer want to hear metadata 104 rendered, and will therefore discontinue rendering after the threshold number is reached.

For the purposes of this disclosure, the media player 112 is hardware, software, or some combination of the two that renders media objects and audible metadata. If a media player 112 includes software, then it is also possible for the software to be encoded in hardware such as is seen with portable media players like the IPOD. For the purposes of this disclosure, hardware with an encoded media player will also be referred to as a media player 112, and used interchangeably with element 110, as would be understood by a person of skill in the art. In the embodiment shown, the media player 112/media playback system 110 may be a portable media player, such as an IPOD, CREATIVE ZEN, or IPHONE; an application on a personal computing device, such as WINDOWS MEDIA Player, or ITUNES; or a wireless receiver, such as a WALKMAN, IPHONE, SiriusS50, or Starmate, or any other hardware, software of firmware, alone or in combination, that functions to convert digital media into human perceptible form. The media player 112 (or system 110) may also be a module of a system that comprises other components.

Figure 2:
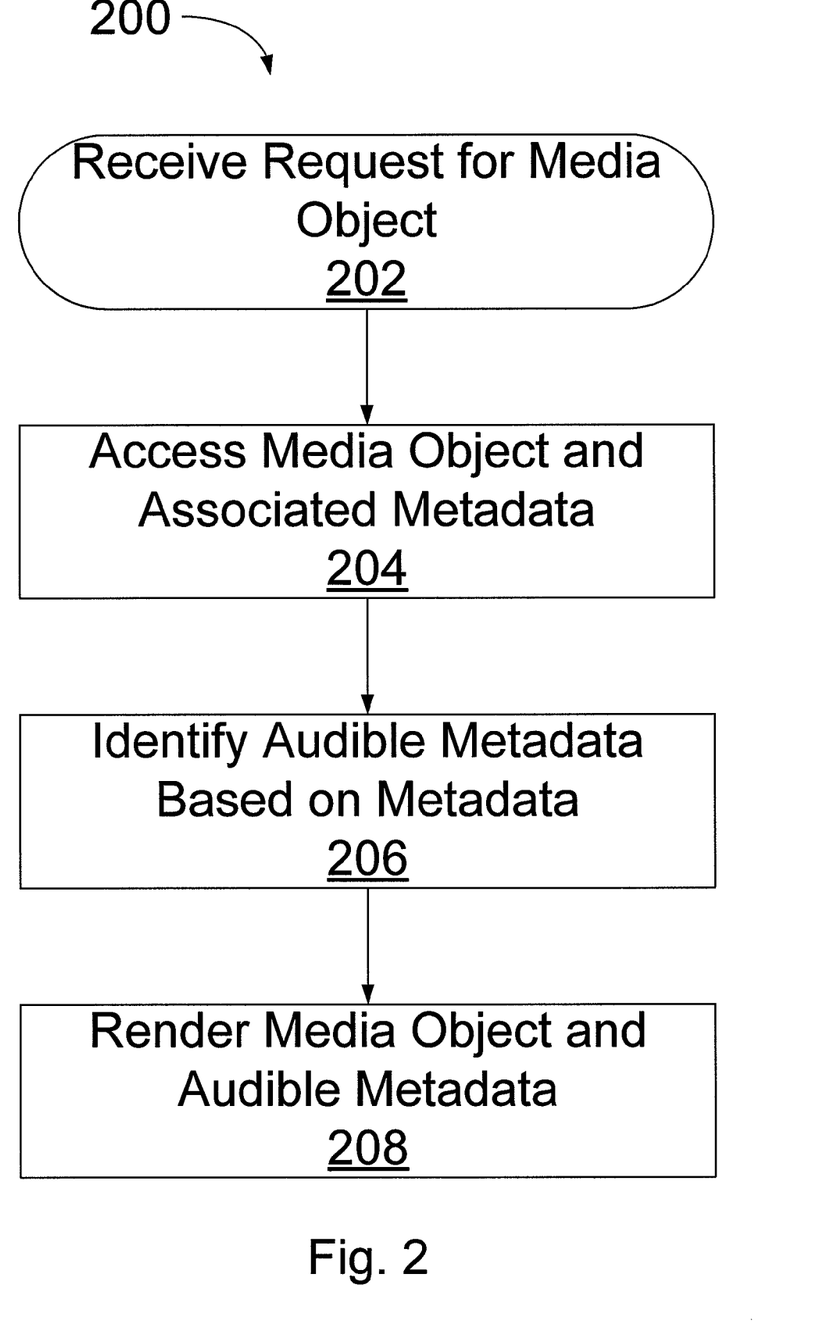
FIG. 2 is a flow chart representing an example of an embodiment of a method for accessing and rendering a media object and audible metadata.

FIG. 2 is a flow chart representing an example of an embodiment of a method for accessing and rendering a media object and audible metadata. In the method 200, a request for the media object is received in a receive request operation 202, and the media object and associated audible metadata may be accessed in an access metadata operation 204. The audible metadata type may be identified and conversion to renderable audible metadata performed if necessary in an identify audible metadata operation 206. The audible metadata along with the media object may be rendered in a render operation 208.

A more detailed description of the method 200 follows. A request for a media object may be initiated in the receive request operation 202. For instance, a user may select a play button on a media playback system interface, wherein the play button initiates a request for a media object. At the same time, a playlist may be displayed on a media playback system and a user may select a particular media object in the playlist, or the device may be set to randomly play media from a library of media. For example, in software-based media players, a user moves a cursor over the description of a media object and selects the media object either by single or double clicking on the media object description. This selection action initiates a request for the selected media object in a receive request operation 202. A request for a media object may also be non-user initiated. For instance, a media player may have an alarm setting that initiates a request for a media object at a pre-set time. A media player may also initiate an automatic request for a media object when a CD or DVD is inserted. For example, WINDOWS MEDIA Player and ITUNES may automatically begin rendering songs on a CD or movies on a DVD when a CD or DVD is inserted into the DVD/CD reader of a personal computer.

The method 200 also includes an access media object and associated metadata operation 204. The access operation 204 includes accessing the media object and accessing the audible metadata for the requested media object. In an embodiment, accessing the audible metadata may include locating the audible metadata. As noted previously, some embodiments envision the audible metadata existing as an embedded element in a media object or as a separate file in any number of locations. Locating the audible metadata may include searching inside the media object for embedded audible metadata, and/or searching in other locations for audible metadata that is stored separate from the associated media object. For example, the audible metadata module may first search an MP3 for indicators that audible metadata is embedded in the MP3. If the audible metadata is not found there, then the audible metadata module may search the computer hard drive where the media object is stored, for the requested audible metadata. If the audible metadata is not found on the hard drive, then the audible metadata module may search remote servers via an Internet connection. The audible metadata module may search in any number of locations as well as search such locations in any order. Storing and accessing the audible metadata separate from the media object permits media objects that are already encoded and stored or accessible by a user to not need to be modified in any way to take advantage of the benefits of audible metadata. In another embodiment, the audible metadata module is pre-configured to read data embedded in the media object directing the audible metadata module to search a specified location for the audible metadata. For instance, an internet protocol address, such as a uniform recourse location (URL), may be embedded in an MP3. The audible metadata module may be pre-configured to look for this embedded address, and use the address to access audible metadata via the Internet. In another example, code may be embedded in a MPEG-7 that guides the audible metadata module to a location on a database of a portable media player where associated audible metadata can be accessed.

The disclosed method also includes an identify audible metadata operation 206. The type of audible metadata may be determined, and the audible metadata may be converted into a renderable form in the operation 206. In another embodiment, data indicating the type of audible metadata may be stored along with the audible metadata, thus simplifying the identify operation 206. In some embodiments, the conversion operation may not be needed as discussed in detail with reference to FIG. 3. As previously noted, the audible metadata will preferably either be text or pre-recorded audio. Determining the audible metadata type may be accomplished via the audible metadata module reading an indicator on the audible metadata that correlates to one of the two audible metadata types. For instance, the first bit of metadata may be a one or a zero, with one corresponding to text-based metadata and a zero indicating audible metadata, and the audible metadata module may determine the metadata type by reading and analyzing this bit. At the same time, the audible metadata module may scan the metadata and determine based on the type of data structure whether text-based or audible metadata exists. Other methods for determining the type of metadata may also be used in the identify operation 206.

The method 200 also includes a render media object and audible metadata operation 208. The operation 208 includes rendering both the media object and the audible metadata. The audible metadata may be rendered before or after the media object, or even during should a user or media supplier deem that desirable. There may be a finite time span between rendering of the media object and audible metadata or no time may elapse. In another embodiment, the audible metadata may be rendered both during the media object rendering and before/after the media object rendering. For instance, the audible metadata may begin rendering before a media object renders, and a finite time after the media object begins to render, the audible metadata stops rendering. The same situation may be seen with the audible metadata rendering overlapping the end of a media object render along with a finite time after the media object has ceased to render.

For embodiments in which the audible metadata and media object are rendered simultaneously, the rendered audio amplitude, or volume, of each may be varied. For example, the media object volume may be rapidly reduced when the rendering of the audible metadata begins. This enhances the listener's ability to clearly hear the audible metadata. When the rendering of the audible metadata is complete, the volume may rapidly rise to the original volume. In another embodiment, at the start of or just before the audible metadata is rendered, the media object rendering may be turned off or interrupted until rendering of audible metadata is complete or near completion. In yet another embodiment, the media object rendering may be suspended until the audible metadata has been rendered. In other embodiments, the rate at which the volume changes at the beginning and end of audible metadata rendering may be fast, slow, or any rate in between. The volume may also change instantaneously. It is also envisioned that the volume could gradually change throughout the rendering of the audible metadata, or that the rate of change may not be constant. An exponential rate of volume change is one example.

Figure 3:
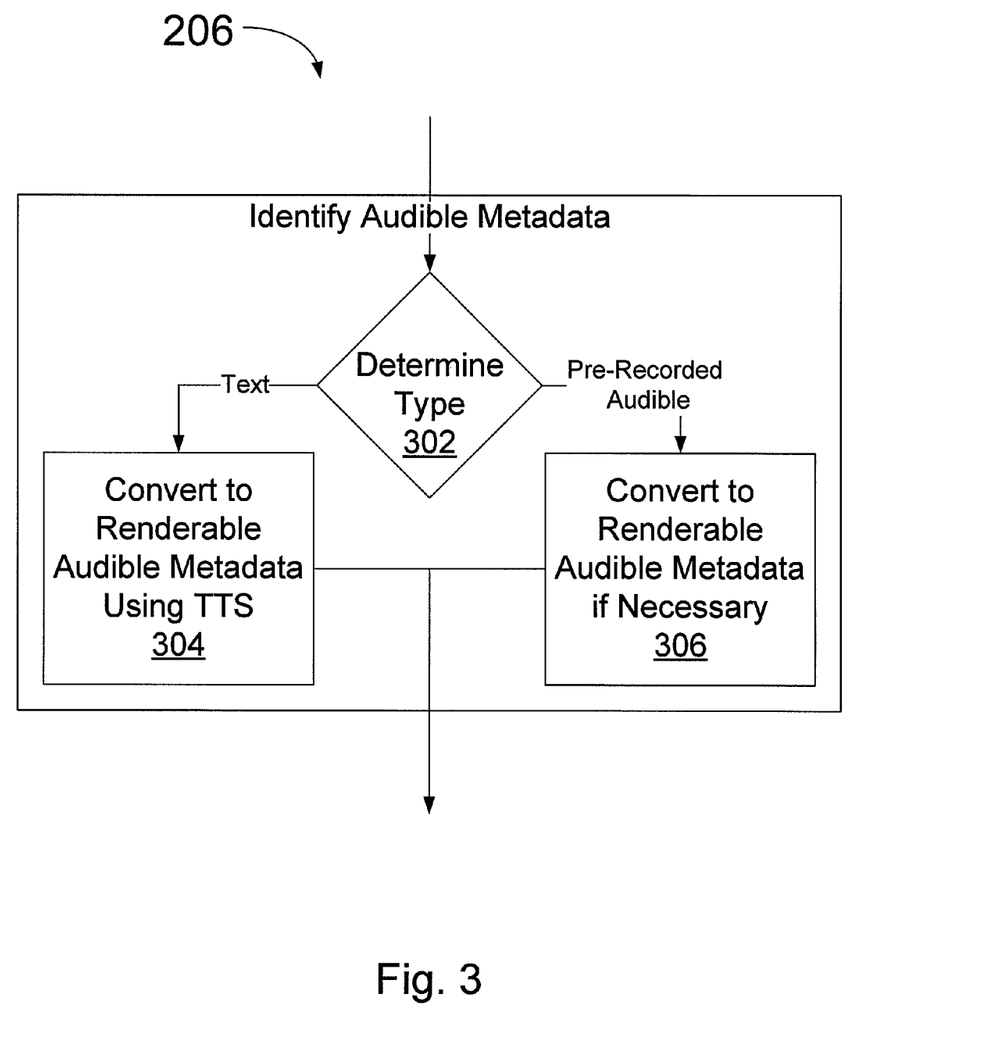
FIG. 3 illustrates an embodiment of a method for performing the identify audible metadata operation.

FIG. 3 illustrates an embodiment of a method for performing the identify audible metadata operation. In the illustrated embodiment, the identify audible metadata step 206 includes a determination of audible metadata type 302 as well as a processing step wherein audible metadata is converted to a renderable form. The audible metadata module may perform the audible metadata type determination 302. Alternatively, if metadata is text-based, then a first converting step 304 uses the text-to-speech module to convert the audible metadata to renderable form. If audible metadata is pre-recorded, then a second converting step 306 may prepare the audible metadata for rendering. For instance, a media object may be a first MP3. Audible metadata, in the form of the audio data from a second MP3, may be embedded in the tag of the first MP3. The embedded second MP3 may lack code that usually precedes an MP3 file. Without this code, a conventional media player is unable to render the embedded second MP3. The audible metadata module 108 on the other hand, may recognize the embedded second MP3, and convert it to a form that is renderable by a media player in the convert to renderable audible metadata operation 306. In some embodiments, pre-recorded audible metadata may be renderable, and as such the operation 306 may not be needed.

If audible metadata is text, then a convert to renderable audible metadata using TTS operation 304 may be used to generate renderable audible metadata. As discussed previously, the TTS module can perform such a conversion.

In an embodiment that is not illustrated, the identify audible metadata operation 206 may include appending audible metadata to the media object. For instance, audible metadata may be appended to an MP3 file, so that when rendered, the audible metadata and media object render as a continuous audio clip. In another example, a playlist may be generated wherein audible metadata is added before or after the associated media object, or after a group of media objects (e.g. identifying the previously rendered three songs in a playlist).

Figure 4:
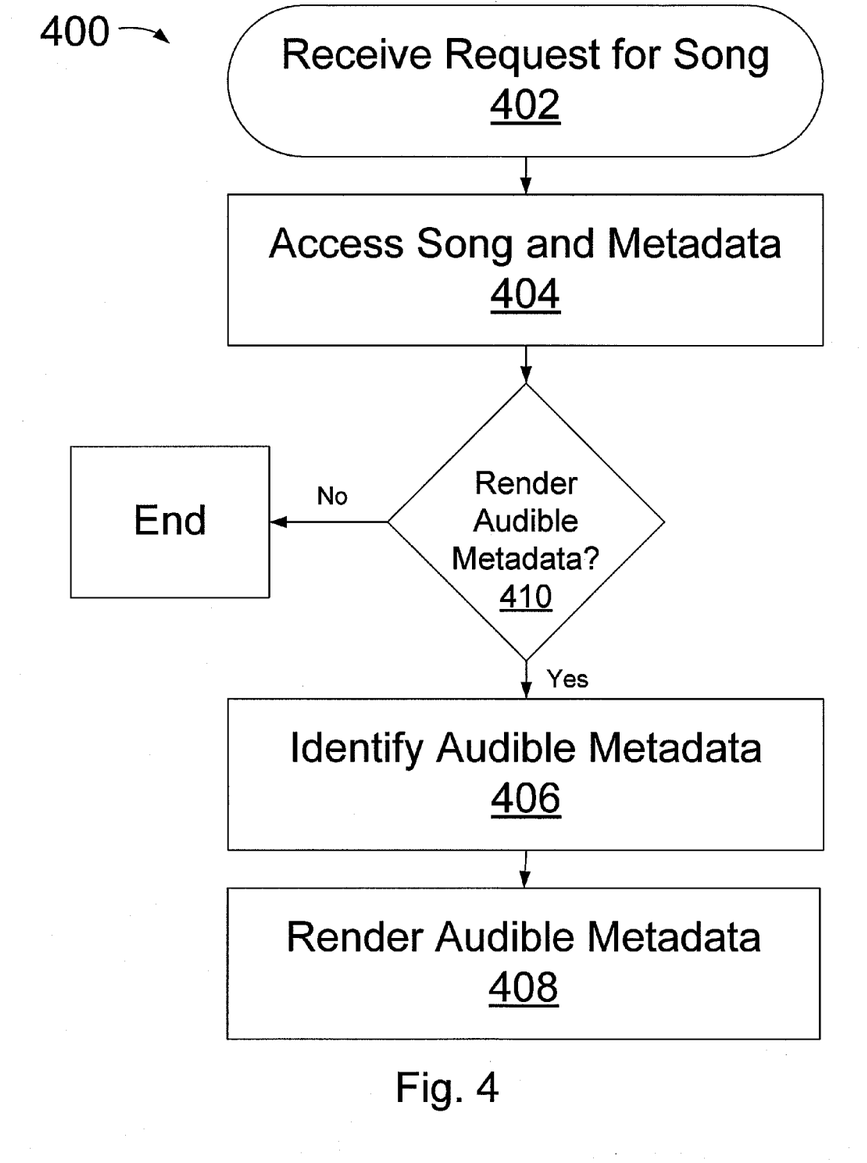
FIG. 4 is a flow chart of an embodiment of a method for accessing, identifying, and rendering audible metadata.

FIG. 4 is a flow chart of an embodiment of a method for accessing, identifying, and rendering audible metadata. For simplification, in the method 400 and all subsequent embodiments, the media object is a song. It should be noted, that this does not limit the present disclosure to embodiments in which the media object is a song, as discussed above a media object can be any of a myriad of digital content types, including for example video, audio, spoken word, images, etc.

A song request is received in a receive request for media object operation 402, as for instance when a play button on a media device such as an IPOD is depressed or via selection of an onscreen button in a computing application such as WINDOWS MEDIA Player or ITUNES. The song request may be also be initiated by a computing device such as when a media player's wake-up alarm initiates or a shuffle or random play mode is invoked, or when a playlist is pushed or loaded into a device, or when an internet or satellite radio station is navigated to.

The method also includes an access song (or other media object) and metadata operation 404. Similarly to the discussion of FIG. 2, accessing includes locating the metadata. The method 400 includes an optional determination operation 410 in which the system determines if audible metadata should be automatically rendered when rendering the requested song (e.g. if a user elects not to have audible metadata rendered). If the determination operation 410 determines that audible metadata is not to be rendered, then the method 400 ends and the song is rendered without audible metadata. If the determination operation 410 determines that audible metadata is to be rendered, then an identify audible metadata operation 406 and render audible metadata operation 408 are performed. Embodiments of these operations 406, 408 have been previously discussed with reference to FIG. 2.

The determination operation 410 may make its determination based on a default setting or other information. In an embodiment, a system may provide a user with access to a global audible metadata default setting that allows the user to select if and when audible metadata should be rendered. For example, a user may be able to select a setting that instructs the system to always play audible metadata when possible. Such a global default setting may also allow the user to dictate when, relative to the rendering of the song (i.e., preceding the song, after the song, during the song, etc.), and how the audible metadata is to be rendered.

The disclosed method is not limited to the order presented in FIG. 4. For example, in another embodiment the render audible metadata determination operation 410 may occur after the audible metadata identify operation 406. This order may be preferred in applications where a song is being transmitted to a large number of listeners, such as in a satellite radio network. In a satellite radio network it may be preferable for the audible metadata to be identified at the satellite or at a server transmitting to the satellite, and allow receivers to perform the determination step. Otherwise, the satellite or its server may be responsible for performing the determination operation 410 for every receiver—an exceedingly cumbersome process.

Figure 5:
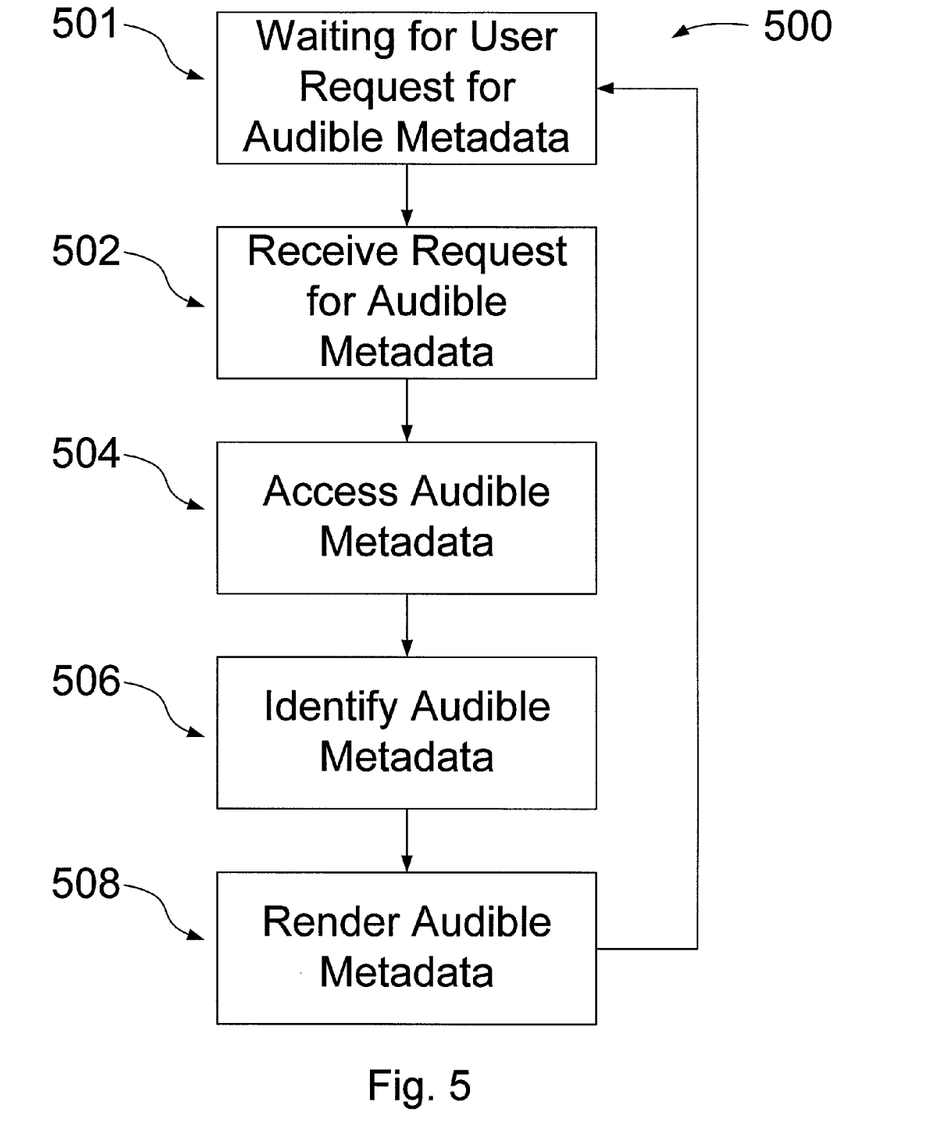
FIG. 5 is a flow chart of an embodiment of a method for accessing, identifying, and rendering audible metadata wherein a request for audible metadata is received during media object rendering.

FIG. 5 is a flow chart of an embodiment of a method for accessing, identifying, and rendering audible metadata wherein a request for audible metadata is received during media object rendering. In the method 500, a song may be being rendered or may simply be selected by the user. The method 500 begins in a standby state, waiting for the user to request audible metadata. This is illustrated by the waiting operation 501. The user request may be made through hardware or software based selection. This may include depression of a physical button, toggling of a switch, heat-activated touch sensor, voice-activated selection, selection of a software based button or checkbox, or any other means of selection. For instance, a portable media player may be rendering a song, and the audible metadata module continuously or intermittently monitors an audible metadata request button. This situation may arise if, for instance, a user is listening to a song on a portable media player without a display, but wants to know the name and artist of the song. The user pushes an audible metadata request button and initiates a request for audible metadata.

If a user request is made, the request is received in a receive request for audible metadata operation 502. Continuing the above-noted example, this step may be manifested in the audible metadata request button being selected and electronics or software associated with the button transmitting an audible metadata request to the audible metadata module.

The method 500 also includes an access audible metadata operation 504, an identify audible metadata operation 506, and a render audible metadata operation 508 as previously described with reference to FIG. 2. Upon rendering, the method 500 returns to the state of waiting for a user request 501.

The request may be generated by and received from various sources. In one embodiment, the request may be made by a computing device. For instance, a system may exist wherein a computing device analyzes a media object that is being rendered and determines that audible metadata should be rendered. In such a situation, the computing device requests the audible metadata during media object rendering.

In another embodiment a method may include a waiting operation 501 as well as include a determination operation 410. For example a user may pre-select audible metadata for rendering via a default selection, but also have the option of requesting audible metadata during media object rendering. Such a need may arise if, for instance, the user does not pre-request audible metadata, but decides during media object rendering, that audible metadata is desired. Alternatively, if the default calls for audible metadata to be rendered, and the user wants to hear the audible metadata a second time during rendering, then the user can request audible metadata without having to restart the song or wait until the song finishes.

Figure 6:
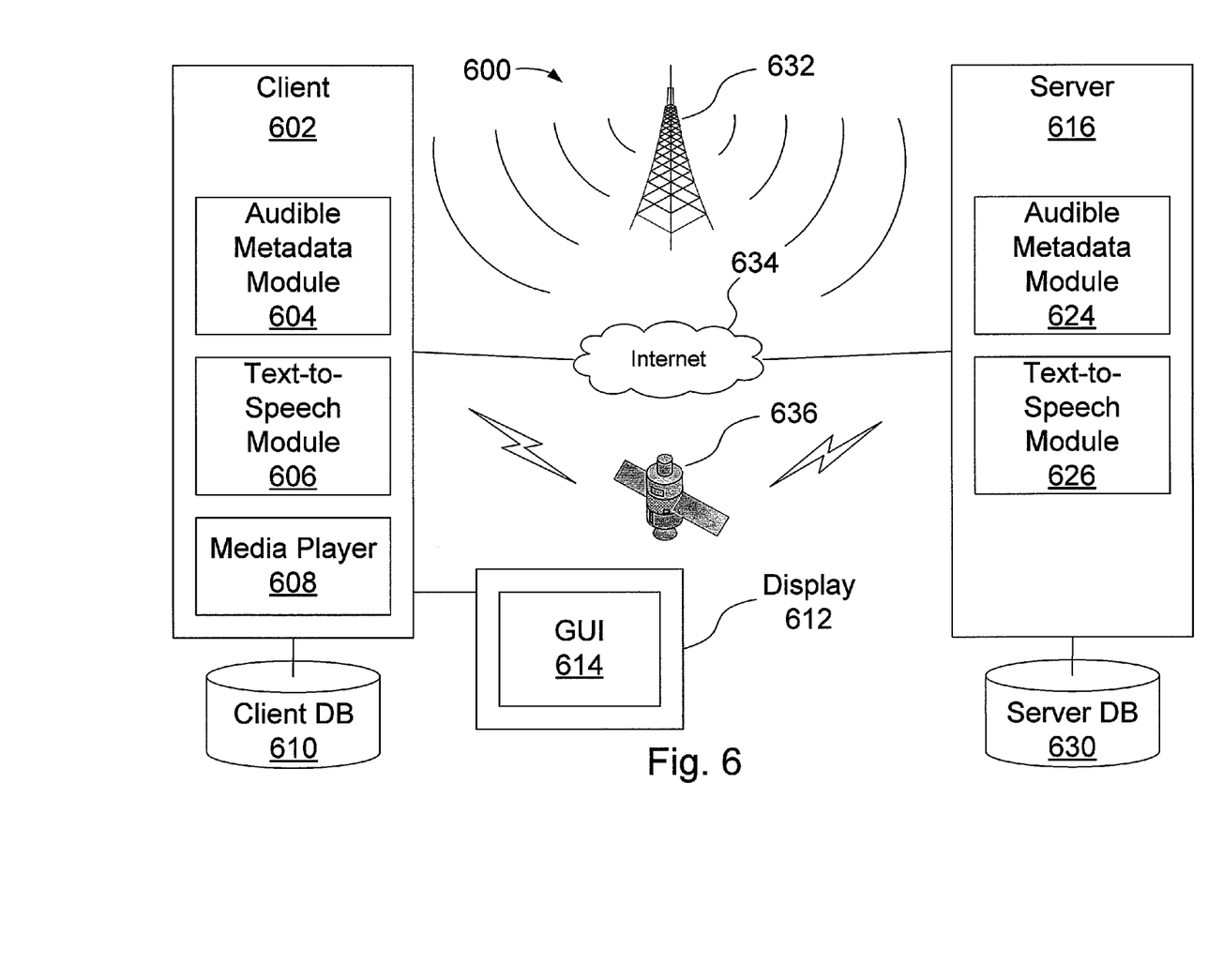
FIG. 6 illustrates an embodiment of a system for accessing, identifying, and rendering audible metadata.

FIG. 6 illustrates embodiments of a system for accessing, identifying, and rendering audible metadata. With reference to FIG. 6, the media object will again be discussed in terms of a song. The architecture 600 illustrated is a networked client/server architecture in which a computing device of any type, the client 602, issues a song request and an audible metadata request to a remote computing device, the server 616, which responds by transmitting the requested song and requested audible metadata to the client 602 for rendering. The systems and methods described herein are suitable for use with other architectures as discussed in greater detail below. It should also be noted, that in certain embodiments the server 616 may not be included/necessary, as all elements may be implemented on a user's computing device.

The client 602 may comprise a media player 608, and a graphical user interface (GUI) 614 presented via a display 612. Both the client 602 and server 616 may include one or more of the following: an audible metadata module 604, 624, a text-to-speech module 606, 626, and a database 610, 630. In the illustrated architecture 600, the client 602 and server 616 may be linked via satellite 636, wireless link 632, or the internet 634. One skilled in the art will recognize that the architecture 600 is not limited to these three forms of links, and that other methods for communicating between a client and server may be used. For instance, the link could be an intranet, or a wireless local network.

In one embodiment the client 602 requests audible metadata from the server 616 for a designated song. The server 616 retrieves audible metadata stored on a server database 630 and transmits the audible metadata back to the client 602. The request may be made as soon as a new song is downloaded to the client 602 and the metadata may be stored on and retrieved from the local storage thereafter. Alternatively, the request may be made every time the media player 608 renders the song. For this embodiment embodiment, instead of long-term storage, the metadata may be cached, and subsequently deleted after the song has been rendered or when the media player 608 is turned off. The server 616 may also store the audible metadata on the server database 630 and stream the audible metadata to the media player 608 without storing the audible metadata on the client 602.

In another embodiment, the metadata is text-based, and must be converted to renderable audible metadata. As discussed above, this may be done using a TTS module. The TTS module 606 may reside with the client 602. In this embodiment, when the client 602 requests audible metadata from the server 616, the server 616 may return text-based audible metadata that the client's TTS module 606 converts to renderable audible metadata. This audible metadata may be immediately rendered or stored for subsequent rendering. In an alternative embodiment, the TTS module 606 may also reside on the server 616. When the client 602 requests audible metadata from the server 616, the server's TTS module 626 converts the text-based audible metadata into renderable audible metadata and transmits the audible metadata to the client 602. The media player 608 may render the audible metadata or the audible metadata module 604 may store the audible metadata for subsequent rendering. In another embodiment, the text-based audible metadata is converted to renderable audible metadata via a TTS module 626 on the server, and the audible metadata is stored on the server database 630 to be transmitted at another time. It should be understood that the various elements of the client and server may be sub-elements of each other in other embodiments. For instance, the TTS module 606 may be a part of the audible metadata module 604, the media player 608 may be a part of the audible metadata module 604, or any other combination that is practical.

In an embodiment, the client 602 may be a wireless receiver such as a satellite radio receiver. If the client has a database 610, then the audible metadata may be stored upon receipt from the satellite 636. However, in some cases the client 602 will not have a database 610 and the audible metadata may be rendered without being stored on the client 602. Other wireless transmitters 632 may be substituted for the satellite 636 in this embodiment.

In another embodiment, a song may be stored on the client 602 having been retrieved from a computer readable medium such as a compact disc or a flash drive or been previously stored or ripped. In this embodiment the song may not be retrieved with associated metadata. However, the audible metadata module 604 may recognize the absence of metadata, and send a request to the server 616 for audible metadata. This may happen as soon as the song is stored on the client database 610, may be performed when a request to render the song is made, or may be performed during song rendering.

In another embodiment there is only a client 602. This situation may arise, if a compact disc (CD) is used to retrieve songs and the songs on the CD include associated metadata. In this embodiment, the metadata is stored on the client database 610 for later retrieval, and thus metadata retrieval from a server may not be necessary. Text-based metadata may be rendered after audible metadata identification using a TTS module 606, and audible metadata may be processed by the audible metadata module 604 or rendered without processing.

In yet another embodiment, a request for a song and audible metadata is received by the server 616, and the server 616 accesses the requested song and audible metadata and combines the two. The combination is returned to the client 602 and rendered either as two consecutive audio clips in a playlist or as a single event with the audible metadata preceding or following rendering of the song. This embodiment can also be applied to a client-only situation in which the client 602 performs the combining action or to a client-server system in which the combination is streaming media.

In another embodiment, the client is a portable media player. The portable media player has a database 610, audible metadata module 604, and TTS module 606. The client database 610 is populated with media objects and associated metadata through either a link to a server 616, or a computer readable medium. Text-based metadata is converted to renderable audible metadata by the TTS module 606 and rendered by the audible metadata module 604, while audible metadata may be processed by the audible metadata module 604 or may be rendered without processing.

In another embodiment, a TTS module 606, 626 and audible metadata module 604, 624 may reside on both a client 602 and server 616. In this manner, the TTS process and/or audible metadata identification and rendering can be performed at either the server 616 if the link 632, 634, 636 is operating optimally, or at the client 602 if the link 632, 634, 636 is not operating optimally. For instance, while the server-based operation may be preferred, there may be times when the internet connection 634 prevents the server 616 from performing the TTS operation. In this situation the TTS module 606 associated with the client 602 may perform TTS of metadata until the internet connection 634 is repaired or resumed. In other situations, the connection 632, 634, 636 may simply be less than optimal, such as at periods of high internet traffic, in which case it may be preferable for the operations associated with the TTS module 606 and/or audible metadata module 604 to take place on the client 602 rather than the server 616.

Figure 7:
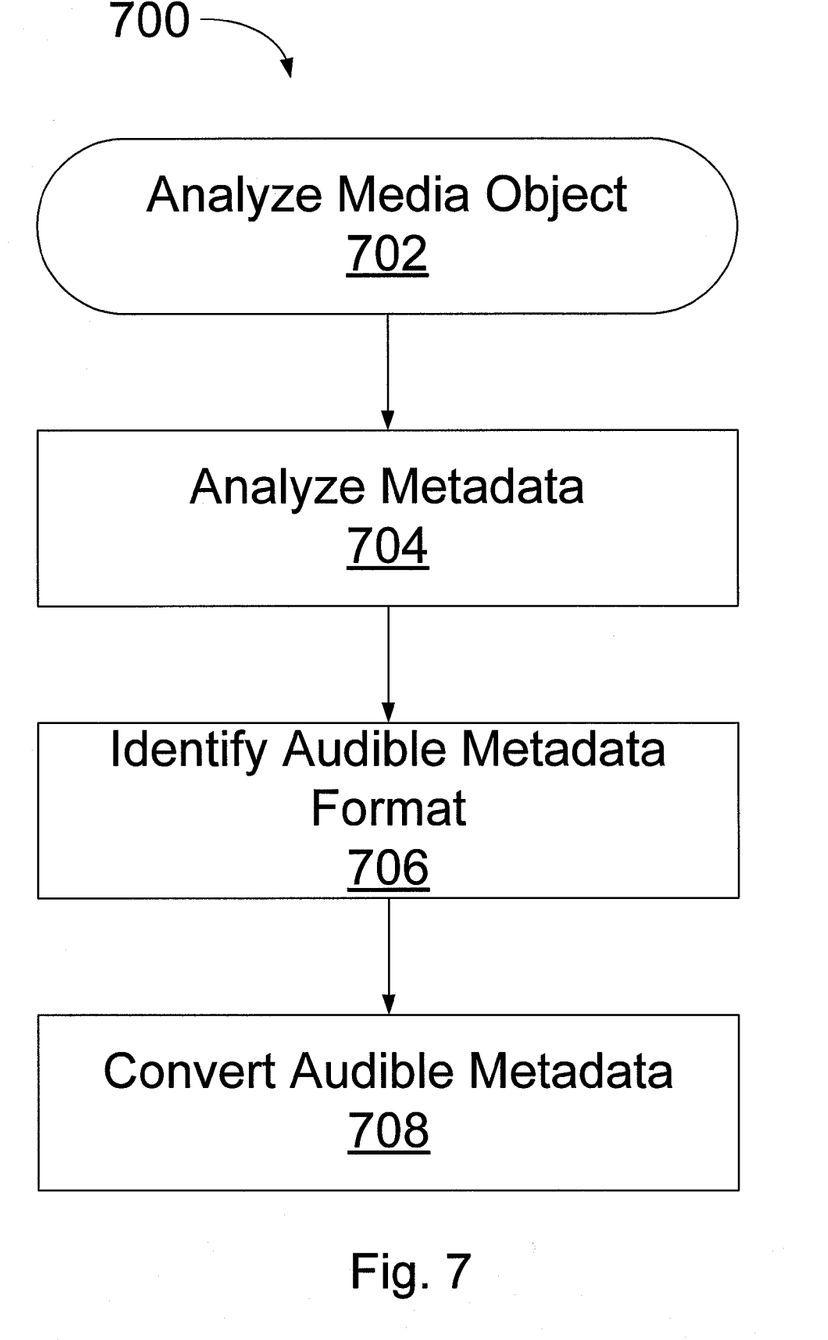
FIG. 7 is a flow chart representing an embodiment of a method for accessing and rendering a media object and audible metadata.

FIG. 7 is a flow chart representing an embodiment of a method for accessing and rendering a media object and audible metadata. The method 700 may include an analyze media object operation 702, in which a media object is analyzed in order to identify metadata associated with the media object. For example, an audible metadata module may analyze an MP3 data structure, searching for metadata associated with the MP3.

The method 700 may also include an analyze metadata operation 704. In this operation 704, metadata is analyzed in order to identify audible metadata. In other words, this operation 704 identifies audible metadata from the metadata identified in the analyze media object operation 702. For instance, an MP3 may include metadata that an audible metadata module has identified. The audible metadata module may then analyze the metadata to identify audible metadata. This may include identifying computer instructions that instruct a computing device as to how to and where to find the audible metadata. Alternatively, the audible metadata may be part of the media object, and analyzing the metadata may show that the audible metadata may be found with or within the media object.

Audible metadata may exist in various formats such as .MP3, .WAV, MIDI, computer code embedded in an audio or video file, and other formats. Without identifying the format, a media player may not be able to operate on or render the audible metadata. As such, the method 700 may include an identify audible metadata format operation 706.

Whether or not audible metadata may be operated on or rendered by the media player, the method 700 may include a convert audible metadata 708 operation to handle audible metadata that is not in the desired format. For instance, if audible metadata is code embedded in a first MP3, then the code may be converted into a second MP3 or some other format that a media player may render. Alternatively, a given media player may only render a certain format of audible metadata, yet the audible metadata to be rendered is in another format. As such, the convert audible metadata operation 708 may convert the audible metadata from the non-renderable format to the renderable format.

Figure 8:
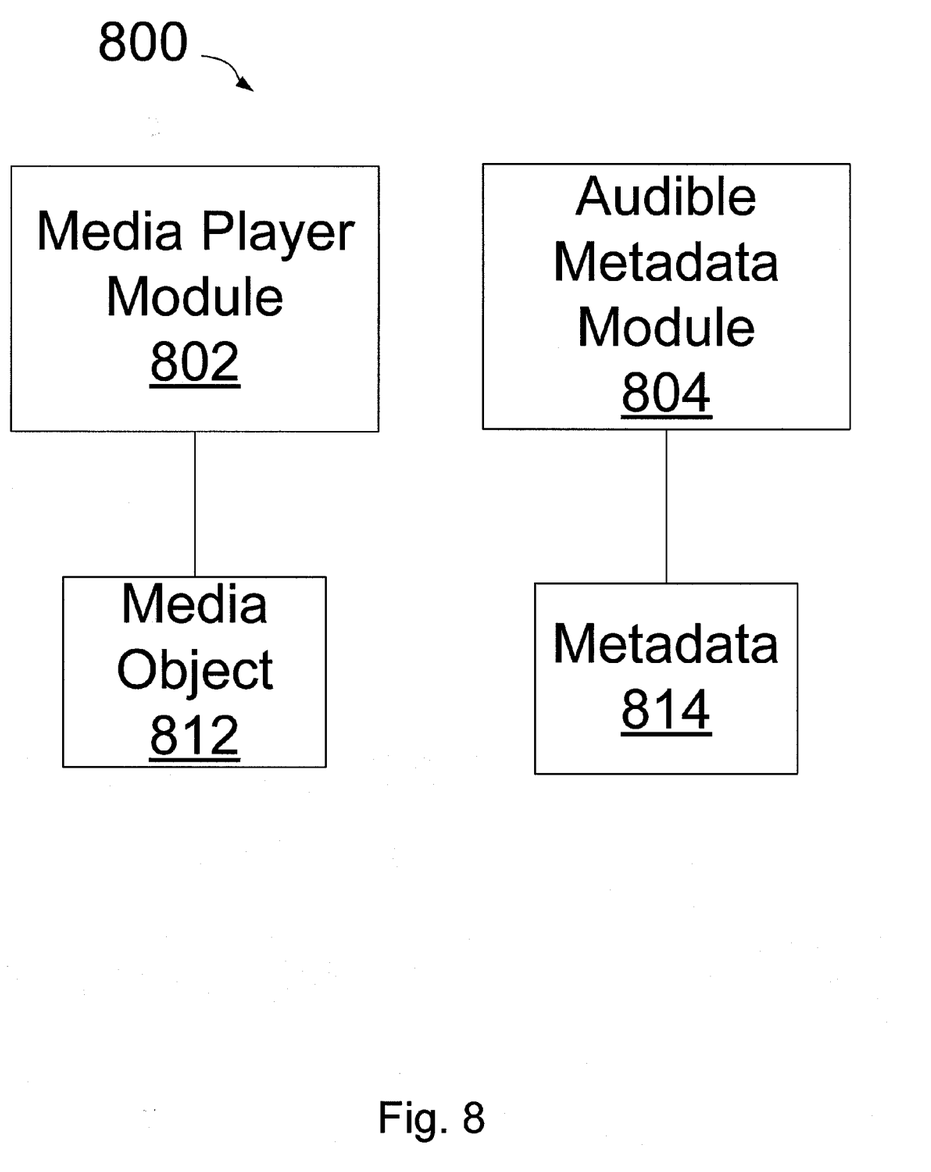
FIG. 8 is an embodiment of a system including a media player module and an audible metadata module.

FIG. 8 is an embodiment of a system including a media player module and an audible metadata module. In the system 800 the media player module 802 accesses and renders the media object 812, while the audible metadata module 804 accesses metadata 814 associated with the media object 812 and renders an audible form of the metadata 814 to the user. In one embodiment the system 800 may include a metadata retrieval module in communication with a remote system. The metadata retrieval module may be able to locate and retrieve metadata if the metadata is not stored on a local system.

Figure 9:
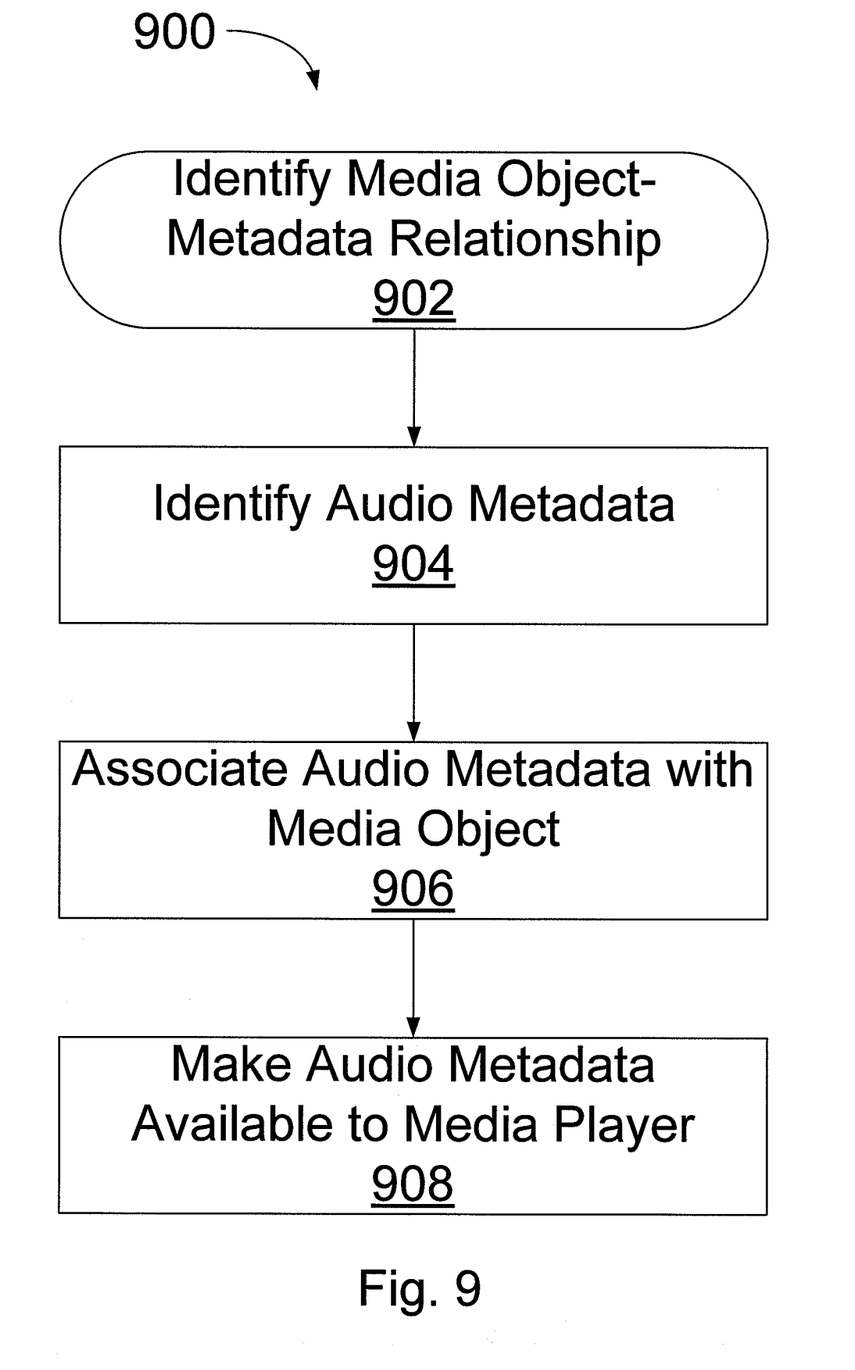
FIG. 9 is a flow chart representing an embodiment of a method for accessing and rendering a media object and audible metadata.

FIG. 9 is a flow chart representing an embodiment of a method for accessing and rendering a media object and audible metadata. In the embodiment shown, the method 900 may include an identify media object-metadata relationship operation 902. In this operation 902 the relationship between a media object and metadata may be identified. This may include indexing available media objects and metadata and determining which media objects are associated with certain metadata. These relationships may then be available for the media player to access when audible metadata is requested.

In the method 900, it may also be desirable to identify audible metadata, and this can be done via an identify audible metadata operation 904. This operation 904 may involve using the metadata to identify the audible metadata. Identifying audible metadata may include locating audible metadata. Identifying may also include determining the audible metadata format.

Although the relationship between the media object and the audible metadata has been determined, the relationships may not be useful to a media player until audible metadata is associated with media objects. Audible metadata may be associated with a media object in an associate audible metadata with media object operation 906. In an embodiment, associating media objects and audible metadata may include storing both in the same location so that they may be grouped during access by a media player. In another embodiment, associating may include storing information regarding the association on a computer readable medium, and making the information available for access.

In an embodiment, the method 900 may include a make audible metadata available to media player operation 908 allowing the audible metadata to be audibly rendered for a user. To make audible metadata available may include providing the audible metadata to a media player or it may include storing the audible metadata in a location accessible by a media player. This operation 908 may also include converting audible metadata to a format that is renderable by the media player.

Figure 10:
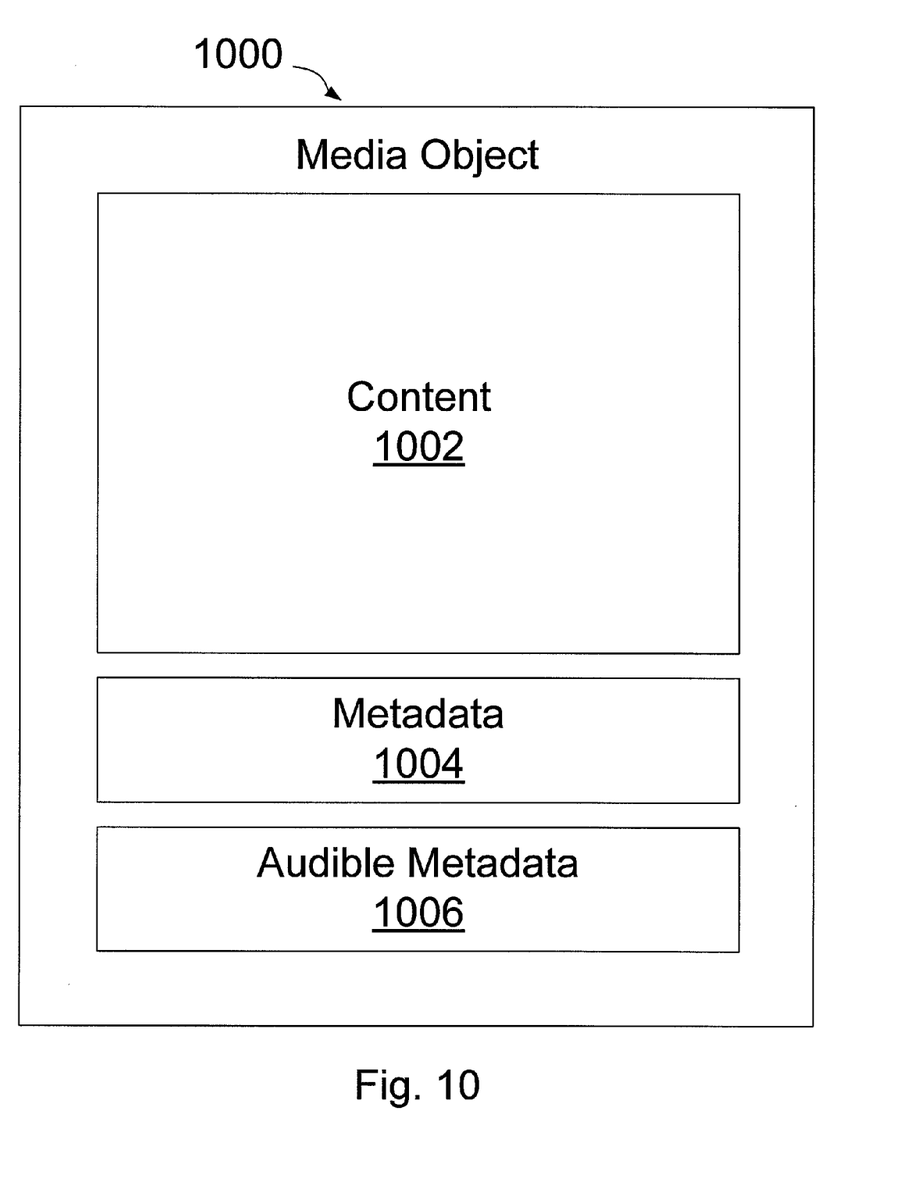
FIG. 10 illustrates an embodiment of a media object.

FIG. 10 illustrates an embodiment of a media object. In this embodiment, the media object 1000 may include content 1002, metadata 1004, and audible metadata 1006. Content 1002 may include audio, visual, or other media that may be provided to a media player for rendering. Metadata 1004 and audible metadata 1006 are illustrated as separate entities, however in one embodiment audible metadata 1006 may be included in metadata 1004. In the illustrated embodiment, metadata 1004 may describe the content 1002. For instance, the metadata may be convertible to a format that is audibly renderable by a media player. Alternatively, the metadata may include computer code that when accessed by a media player or audible metadata module, gives rise to text such as media title, artist, or genre being displayed for a user. In one embodiment, metadata 1004 may instruct a computing device, such as the audible metadata module, to access the audible metadata 1006. In another embodiment the audible metadata 1006 and metadata are associated with the content 1002, but are located separately from the media object 1000, such as on a remote server.

It should be recognized, that although much of this disclosure has discussed embodiments in which the media object is a song, alternative media objects can be substituted for the song and not change the intent of this disclosure. It should also be noted that the disclosure is not limited to one of the communication links discussed. Various embodiments may include the use of multiple links such as satellite and internet, or wireless and satellite, or any other combination or number of links.

Those skilled in the art will recognize that the methods and systems of the present disclosure may be implemented in many manners and as such are not to be limited by the foregoing exemplary embodiments and examples. For example, modules may be embodied in hardware, software, a combination of the two, or other means. Further, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, certain audible metadata may be available only after purchase. For instance, audible metadata producers may pre-record audible metadata using well-known personalities or even use the artists/authors of media objects to pre-record audible metadata. This audible metadata may only be acquired through purchase, or via payment of a fee in addition to other fees that may be associated with audible metadata usage.

For example, and with reference to FIG. 6, the client 602 may comprise a computing device and a portable media player each having a different database. In other words, the client database 610 of FIG. 6 may be distributed amongst multiple devices. The same holds for the server database 630. In another example, the computing device and portable media player may both contain an audible metadata module 604, 624 and/or a text-to-speech module 606, 626. Another example includes a system wherein audio or visual programming is streamed to the client 602, such as streaming music or streaming television programs, the client 602 stores the contents of the streaming media, and renders the stored contents of the streaming media any number of times and at any time after the storage takes place. Metadata may be included in the stream and the audible metadata module 604 may render the stream along with the metadata. Alternatively, the stream may not include metadata. In this embodiment, the audible metadata module 604 will recognize that metadata 104 is not included in the stream and will retrieve metadata from the server and render the metadata along with the streaming media.

Numerous other changes may be made that will readily suggest themselves to those skilled in the art and which are encompassed in the spirit of the invention disclosed and as defined in the appended claims.

What is claimed is:

1. A method comprising:
receiving, at a computing device, a media object, said media object being a digital content object;
analyzing, via the computing device, the media object to identify metadata associated with the media object;
identifying, via the computing device, the metadata associated with the media object;
analyzing, via the computing device, said identified metadata and determining, via the computing device based on said analysis of the identified metadata, a type of said metadata, said analysis of the identified metadata further comprising identifying non-text audible metadata within said metadata based on said determination of said type of metadata;
identifying, via the computing device, an audio format of the non-text audible metadata associated with the media object;
determining, via the computing device, a desired audio format of the non-text audible metadata; and
converting, via the computing device, said non-text audible metadata associated with the media object into the desired audio format when said audio format is not in the desired audio format.

2. The method of claim 1, further comprising:
locating the identified metadata if the identified metadata is at a location different from the media object.

3. The method of claim 1, further comprising:
locating the identified non-text audible metadata if the identified non-text audible metadata is at a location different from the identified metadata.

4. The method of claim 1 further comprising:
passing said converted non-text audible metadata to a media player for audible rendering to a user so as to audibly identify information related to said media object to said user.

5. The method of claim 1 wherein said non-text audible metadata is text and the identifying a format step comprises: converting said non-text audible metadata by text to speech conversion.

6. The method of claim 1 wherein said non-text audible metadata is digitized audio.

7. The method of claim 6 wherein said digitized audio comprises a digital recording of a person.

8. The method of claim 7 wherein the person is a recording artist.

9. The method of claim 1, further comprising:
converting said non-text audible metadata from a first digital format to a second digital format, said first digital format being different from said second digital format.

10. The method of claim 1, further comprising:
making said audible, non-text form of the metadata available to a media player.

11. The method of claim 10, further comprising:
converting said audible, non-text form of the metadata to a desired format prior to the making said audible, non-text form of the metadata available step.

12. The method of claim 10, further comprising:
charging a fee to a user when the making said audible, non-text form of the metadata available step is carried out.

13. A system comprising:
a plurality of processors;
a media player module, implemented by at least one of said plurality of processors, that accesses a media object and renders the media object to the user; and
an audible metadata module, implemented by at least one of said plurality of processors, that accesses and analyzes metadata associated with the media object, identifies the metadata based on said analysis, and renders an audible, non-text form of the metadata to the user based on a determined type of said metadata and a desired audio format of the metadata, said rendering of the audible, non-text form of the metadata comprises converting the audible, non-text form of the metadata associated with the media object into the desired audio format when said audible form is not in the desired audio format.

14. The system of claim 13, further comprising:
an automated text to speech module that reads text data, if said audible, non-text form of the metadata is in the form of text data, and converts it to speech to generate the audible, non-text form of the metadata.

15. The system of claim 13, further comprising:
storage for storing media objects, metadata and/or audible, non-text form of the metadata.

16. The system of claim 13, further comprising:
a metadata retrieval module that communicates with a remote system to locate and retrieve said audible, non-text form of the metadata if located separately from said system.

17. The system of claim 13, wherein the audible, non-text form of the metadata module renders the audible, non-text form of the metadata in response to a command received from the user.

18. A non-transitory computer readable storage medium tangibly encoded with computer executable instructions, that when executed by a processor associated with a computing device, perform a method comprising:
receiving a command to render a renderable media object comprising a renderable media object data and information identifying metadata associated with the renderable media object data, said command comprising an indication of a desired format of the metadata;

wherein the metadata identifies its type of metadata and identifies audio data, said audio data being non-text audible metadata associated with the media object that is different from the renderable media object data;

identifying the metadata; and rendering the renderable media object data and further rendering the audio data based on the desired audio format of the audio data identified in the command, said rendering the audio data comprises converting the metadata associated with the renderable media object data into the desired audio format when said audio data is not in the desired audio format.

19. The non-transitory computer readable storage medium of claim 18 wherein the audio data is stored as part of the media object.

20. The non-transitory computer readable storage medium of claim 18 wherein the metadata identifies a different media object as the audio data.

21. The non-transitory computer readable storage medium of claim 20 wherein the metadata identifies the different media object as being stored in a location remote from the computer readable medium.

22. A method comprising:

receiving, via a computing device, a request for a media object, said media object being a digital content object;

accessing, via the computing device, the media object;

analyzing, via the computing device, the media object, and based on said analysis, identifying metadata associated with the media object, said analysis further comprising identifying a type of said metadata;

identifying, via the computing device, non-text audible metadata associated with the media object based on the identified type of said identified metadata;

determining, via the computing device, a desired audio format of the audible metadata;

rendering, via the computing device, the media object; and rendering, via the computing device, the audible metadata for audible perception based on the desired audio format of the audible metadata, said rendering the audible metadata comprises converting the audible metadata associated with the media object into the desired audio format when said audible metadata is not in the desired audio format.

23. The method of claim 22 wherein said analyzing metadata further comprises:

locating the metadata.

* * * * *